United States Patent
Li et al.

(10) Patent No.: US 11,345,869 B2
(45) Date of Patent: May 31, 2022

(54) HYDRATE FORMATION PROMOTER AND USE THEREOF IN METHANE STORAGE

(71) Applicant: GUANGZHOU INSTITUTE OF ENERGY CONVERSION, CHINESE ACADEMY OF SCIENCES, Guangzhou (CN)

(72) Inventors: Xiaosen Li, Guangzhou (CN); Yisong Yu, Guangzhou (CN); Zhaoyang Chen, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 261 days.

(21) Appl. No.: 16/613,127

(22) PCT Filed: Mar. 26, 2019

(86) PCT No.: PCT/CN2019/079654
§ 371 (c)(1),
(2) Date: Nov. 13, 2019

(87) PCT Pub. No.: WO2019/223416
PCT Pub. Date: Nov. 28, 2019

(65) Prior Publication Data
US 2020/0339900 A1 Oct. 29, 2020

(30) Foreign Application Priority Data

Dec. 29, 2018 (CN) .......................... 201811646136.4

(51) Int. Cl.
*C10L 3/10* (2006.01)
*B01D 53/02* (2006.01)

(52) U.S. Cl.
CPC .............. *C10L 3/108* (2013.01); *B01D 53/02* (2013.01); *B01D 2257/7025* (2013.01); *C10L 2290/542* (2013.01)

(58) Field of Classification Search
CPC ........... C10L 3/10; C10L 3/108; B01D 53/02; B01D 2257/7025
See application file for complete search history.

(56) References Cited

U.S. PATENT DOCUMENTS 6,706,775 B2 * 3/2004 Hermann ............. A01K 1/0152
424/404

FOREIGN PATENT DOCUMENTS

CN 1324289 C 7/2007
CN 101596393 A 12/2009
(Continued)

OTHER PUBLICATIONS

He (Experimental study on the kinetics of methane hydrate formation for natural gas solid-state storage and transportation, 2015, Shuang-yi He, Chongqing University, Chongqing, China) (Year: 2015).*

(Continued)

*Primary Examiner* — Youngsul Jeong
(74) *Attorney, Agent, or Firm* — Bayramoglu Law Offices LLC

(57) ABSTRACT

A hydrate formation promoter and the use thereof in methane storage. The hydrate formation promoter is a mixed aqueous solution including cyclopentane, sodium dodecyl sulfate and water, wherein a volume fraction of the cyclopentane is 5% to 23.4% and a mass fraction of the sodium dodecyl sulfate is 0.01% to 0.08%. The hydrate formation promoter can realize effective and rapid formation of methane hydrate at approximate room temperature (25° C.), and can remain stable at higher temperatures.

3 Claims, 1 Drawing Sheet

(56) References Cited

FOREIGN PATENT DOCUMENTS

| CN | 103482569 A | 1/2014 |
|---|---|---|
| CN | 203411518 U | 1/2014 |
| CN | 104974713 A | 10/2015 |
| CN | 104841237 B | 6/2018 |
| CN | 109097120 A | 12/2018 |
| KR | 20100012491 A | 2/2010 |

OTHER PUBLICATIONS

He_2015_pp. 25_26_English Translation (Year: 2015).*
He Shuangyi, Experimental Study on the Kinetics of Methane Hydrate Formation for Natural Gas Solid-State Storage and Transportation, A Thesis Submitted to Chongqing University for the Degree of Master of Engineering, May 2014.

* cited by examiner

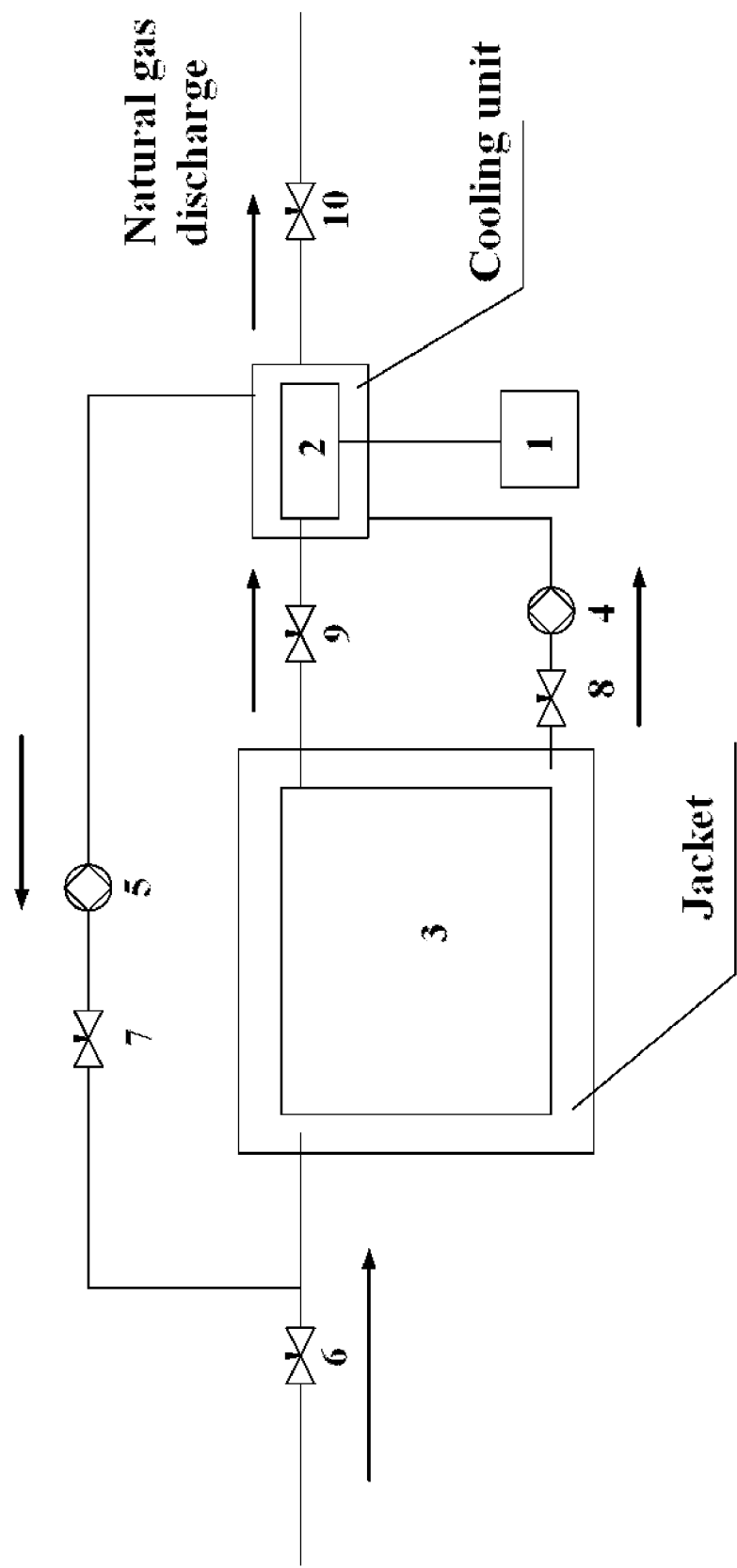

HYDRATE FORMATION PROMOTER AND USE THEREOF IN METHANE STORAGE

CROSS REFERENCES TO THE RELATED APPLICATIONS

This application is the national phase entry of International Application No. PCT/CN2019/079654, filed on Mar. 26, 2019, which is based upon and claims priority to Chinese Patent Application No. 201811646136.4, filed on Dec. 29, 2018, the entire contents of which are incorporated herein by reference.

TECHNICAL FIELD

The present invention relates to the technical field of natural gas hydrate formation, and particularly relates to a hydrate formation promoter and the use thereof in methane storage.

BACKGROUND

The storage and transportation of natural gas have always been a major problem in the international natural gas trade and the development of marginal oil and gas fields. At present, major methods for transporting natural gas includes pipeline transportation, compressed natural gas transportation and liquefied natural gas transportation. For the pipeline transportation, pipeline construction not only requires huge investment, but also has a huge impact on the ecological environment along the line, which is very disadvantageous for long-distance transportation and exploitation of marginal oil and gas fields with small storage capacity. Currently, for international gas trade and urban distribution, compressed natural gas transportation and liquefied natural gas transportation are the major methods. However, the former requires the natural gas to be compressed to an ultra-high pressure, which consumes a huge amount of energy, imposes higher requirements on the storage container, and brings about a huge safety risk; the latter requires the natural gas to be cooled to an ultra-low temperature, which also consumes a huge amount of energy. Natural gas solidification technology is one novel natural gas storage technology developed in recent years, where the methane is stored and transported as solid hydrates by natural gas hydrate formation. Conventionally, one volume of hydrate could store 160 to 180 volumes of natural gas at standard conditions, indicating an extremely high energy density. However, there are mainly two core issues that constrain the development of this technology: the first issue is the extreme requirements of hydrate formation; the second issue is the low formation rate of hydrate. At present, in order to address these issues, researchers enhance the hydrate formation mainly by mechanical enhancements or chemical promoters. Obviously, the former cannot overcome the extreme requirements of hydrate formation, while the latter has been considered to be the most cost-effective way to address these two issues.

Patent "Hydrate promoter and use thereof in preparing gas hydrate with high gas storage density" (published as CN104974713A) discloses promoting the formation of gas hydrate by using aqueous solution of amino acid with various concentrations, and results showed that it could shorten the induction time of hydrate formation to a certain extent, increase the gas storage capacity, and increase the gas storage density. Patent "Use of trimethylene sulfide as hydrate promoter" (published as CN103482569A) discloses promoting the formation of gas hydrate by using trimethylene sulfide, and results showed that this additive could moderate the conditions of hydrate formation while the formation rate of hydrate was about 0.1 to 0.5 mol·min$^{-1}$·m$^{-3}$. Patent "$CO_2$ hydrate formation promoter" (published as CN101596393A) discloses a hydrate formation promoter consisting of quaternary ammonium salts. Patent "Low energy consuming device and method for separating hydrated air" (published as CN104841237B) discloses promoting the formation of gas hydrate by using one or more of several kinetic promoters and thermodynamic promoters. Patent "Method for promoting gas hydrate growth" (published as CN1324289C) discloses promoting the formation of gas hydrate by using surfactants or a mixture of the surfactants with one or more of ionomers, ionic compounds and chemical solvent which are water-soluble or water-dispersible. These technical solutions have a certain promotion effect on certain gas hydrates. However, in general, the promotion efficiencies of these promoters for methane hydrate are not high enough; for commercial application of these technologies, the storage capacity for methane is low, the formation process requires agitation and longer reaction time, and it is impossible to realize the hydrate formation at approximate room temperature. Thus, there is an urgent need to develop a more effective and specific methane hydrate promoter and a method for using it.

SUMMARY

One object of the present invention is to provide a hydrate formation promoter and the use thereof in methane storage. In order to overcome the difficulty in efficiently and continuously forming hydrates, which is encountered in the industrialization of hydrate technology, based on the existing enhancement technology, the present invention provides a hydrate formation promoter which can realize effective methane solidification and storage at room temperature and a method for using it.

One object of the present invention is to provide a hydrate formation promoter, which is a mixed aqueous solution comprising cyclopentane, sodium dodecyl sulfate (SDS) and water. A volume fraction of cyclopentane is 5% to 23.4% based on a total volume of the mixed aqueous solution; a mass fraction of sodium dodecyl sulfate is 0.01% to 0.08% based on a total mass of the mixed aqueous solution.

The hydrate formation promoter provided by the present invention is a stable suspension which is formed by mixing cyclopentane and water at a certain ratio under the action of ultrasonic wave and the surfactant sodium dodecyl sulfate (SDS).

Preferably, the volume fraction of cyclopentane is 10% to 20% based on the total volume of the mixed aqueous solution; the mass fraction of sodium dodecyl sulfate is 0.04% to 0.07% based on a total mass of the mixed aqueous solution.

A second object of the present invention is to provide a method for preparing the above hydrate formation promoter, comprising the following steps: weighing out cyclopentane, sodium dodecyl sulfate and water, adding cyclopentane and water into a container, and then adding sodium dodecyl sulfate into the container; employing ultrasonic waves of 15000 to 60000 Hz to realize mixing and dispersion with a dispersion time of 0.5 to 4 h, and an obtained mixed solution is the hydrate formation promoter.

Preferably, the ultrasonic dispersion time is 1.5 h.

A third object of the present invention is to provide use of the above hydrate formation promoter in methane storage.

Preferably, the hydrate formation promoter is added into a reaction vessel, and then methane is introduced at a temperature of 1° C. to 25° C. and a pressure of 0 to 30 MPa to cause a hydrate formation reaction to occur, so as to allow storage, transportation and dissociation of methane hydrate. The hydrate formation promoter proposed by the present invention can realize effective and rapid formation of methane hydrate at approximate room temperature (25° C.), and can remain stable at higher temperatures.

The induction time for methane hydrate formation is 10 to 60 seconds, the hydrate formation rate has been increased by 15 to 30 times as compared with the water-only system, the reaction complete time is 10 to 50 minutes, and the methane storage capacity for every cubic meter of hydrate is 72 to 157 cubic meters.

Preferably, the hydrate formation promoter is added into the reaction vessel, and then methane is introduced at a temperature of 10° C. to 15° C. and a pressure of 3 to 5 MPa to cause the hydrate formation reaction to occur, so as to allow the storage, transportation and dissociation of methane hydrate.

Preferably, an amphiphilic polyurethane sponge material is used as a carrier of the hydrate formation promoter, wherein the amphiphilic polyurethane sponge material adsorbs the gas hydrate formation promoter. A mass ratio of the carrier amphiphilic polyurethane sponge material and the hydrate formation promoter is 1:15-24.

Since cyclopentane and water are immiscible, though it is possible to form a somewhat stable suspension under the action of SDS and ultrasonic dispersion, the suspension will be separated into layers over time which will affect the promotion effect. Therefore, right after the hydrate formation promoter system is prepared, the amphiphilic polyurethane sponge material should be immediately employed as the carrier to adsorb the reagent, and eventually the hydrate reagent is uniformly and stably dispersed in the gaps of the sponge material, which largely increases the contact area between the gas and the reagent. In order to avoid the rapid hydrate formation in the pores over the sponge surface which hinder the gas from contacting with the reagent inside the sponge material for further hydrate formation, it is necessary to fix the sponge material which is filled with the reagent onto a fluidized bed, so as to enhance the contacting behavior between the gas and the solution, and thereby improve the hydrate formation efficiency.

Preferably, a methane hydrate dissociation device comprises a methane hydrate storage tank, a supersonic separation unit for separating water, cyclopentane and methane, and a cyclopentane recovery tank, which are connected in series. Dissociated methane in the methane hydrate storage tank will be passed through the supersonic separation unit where water and cyclopentane will be condensed into liquids and flow into the cyclopentane recovery tank for recycling, and then the treated methane gas will be discharged. Cold energy will be generated during the dissociation of methane hydrate, and the cold energy can be applied to the supersonic separation unit in order to reduce the energy consumption.

The cyclopentane in the hydrate formation promotion system may be easily consumed due to volatilization during the hydrate dissociation, which contaminates the methane gas and increase the operation cost. Thus, there is an urgent need to address this issue in the use of the hydrate formation promoter of the present invention. Since cyclopentane has a relatively high boiling point (about 49.3° C.) while methane has a relatively low boiling point (about −161.5° C.), the present invention introduces a supersonic separation unit at the discharging unit and makes full use of the cold energy from the hydrate dissociation. The device is able to successfully separate the water, cyclopentane and natural gas (methane), recover the consumed cyclopentane, and dehydrate the methane.

Compared with the prior art, the present invention has the following advantages:

1) The hydrate formation promoter can realize effective and rapid formation of methane hydrate at approximate room temperature (25° C.), and can remain stable at higher temperatures.

2) The hydrate formation promotion system is dispersed in an amphiphilic polyurethane sponge material and applied in combination with a fluidized bed so as to largely improve the hydrate formation rate.

3) Since the hydrate formation promoter itself is combustible, a user can burn the solid methane hydrate directly without recovering the promoter, and it will not further pollute the environment.

4) With the supersonic separation device disposed at the outlet of the hydrate dissociation device, cyclopentane recovery and methane dehydration are realized.

BRIEF DESCRIPTION OF THE DRAWINGS

The FIGURE shows a schematic view showing the structure of a hydrate dissociation device, and the arrows in the FIGURE indicate the flow direction of refrigerant liquid or methane.

Reference numbers in the drawings are:

1. Cyclopentane recovery tank; 2. supersonic separation unit; 3. hydrate storage tank; 4. first corrosion-resistant pump; 5. second corrosion-resistant pump; 6. first liquid check valve; 7. second liquid check valve; 8. third liquid check valve; 9. first stop valve; 10. second stop valve.

DETAILED DESCRIPTION OF THE EMBODIMENTS

The following embodiments are intended to further illustrate the invention but not to limit the invention.

The methods described in the embodiments below can be carried out with reference to conventional techniques where process parameters are not specifically indicated. The reagents and materials not specifically described can be obtained commercially.

The hydrate formation promoter is added into a reaction vessel, and then methane is introduced at a temperature of 0.5° C. to 25° C. and a pressure of 0 to 30 MPa to cause a hydrate formation reaction to occur, so as to allow storage and transportation of methane hydrate.

As shown in the FIGURE, a methane hydrate dissociation device comprises a cyclopentane recovery tank 1, a supersonic separation unit 2, a hydrate storage tank 3, a first corrosion-resistant pump 4, a second corrosion-resistant pump 5, a first liquid check valve 6, a second liquid check valve 7, a third liquid check valve 8, a first stop valve 9 and a second stop valve 10.

Refrigerant liquid flows in through the first liquid check valve 6; an outlet of the first liquid check valve 6 is communicated with a first inlet of a jacket of the hydrate storage tank 3, an outlet of the jacket of the hydrate storage tank 3 is communicated with an inlet of the third liquid check valve 8; an outlet of the third liquid check valve 8 is communicated with an inlet of the first corrosion-resistant pump 4; an outlet of the first corrosion-resistant pump 4 is communicated with an inlet of a cooling jacket of the supersonic separation unit 2; an outlet of the cooling jacket of the supersonic separation unit 2 is communicated with an inlet of the second corrosion-resistant pump 5; an outlet of the second corrosion-resistant pump 5 is communicated with an inlet of the second liquid check valve 7; an outlet of the second liquid check valve 7 is communicated with a second inlet of the jacket of the hydrate storage tank 3; the hydrate storage tank 3 is communicated with an inlet of the first stop valve 9; an outlet of the first stop valve 9 is communicated with an inlet of the supersonic separation unit 2; a first outlet of the supersonic separation unit 2 is communicated with an inlet of the second stop valve 10; a second outlet of the supersonic separation unit 2 is communicated with an inlet of the cyclopentane recovery tank 1.

Hydrate dissociation process comprises the following steps:

1. The dissociated natural gas in the hydrate storage tank 3 flows through the first stop valve 9 into the supersonic separation unit 2, where the water and cyclopentane are condensed into liquids and flow into the cyclopentane recovery tank 1 for recycling; the treated natural gas will be discharged through the second stop valve 10 and then the natural gas will be used.

2. A large amount of cold energy will be generated during the dissociation of methane hydrate. The cold energy will be applied to the supersonic separation unit in order to reduce the energy consumption, and subsequently, the refrigerant liquid will flow through the first liquid check valve 6 into the jacket of the hydrate storage tank 3 so as to absorb the cold energy released during the hydrate dissociation. The cold energy, following the refrigerant liquid, flows through the third liquid check valve 8 and the first corrosion-resistant pump 4 into the cooling unit, so that the cold energy is provided to the supersonic separation unit 2.

3. After releasing the cold energy, the refrigerant liquid flows, through the second corrosion-resistant pump 5 and the second liquid check valve 7, back into the jacket of the hydrate storage tank 3 for recycling.

In all the following embodiments and comparatives examples, the storage, transportation and dissociation of natural gas are realized with the above-mentioned methane storing method and dissociation device.

Embodiment 1

According to a total volume of 100 mL, 90 mL of water and 10 mL of cyclopentane were measured out with a measuring cylinder and added into a closed conical flask. The total mass of the liquid was measured to be 97.52 g using a balance. Based on the total mass of the mixed solution, 0.04 g of sodium dodecyl sulfate was weighed out according to a mass fraction of 0.04% and added into the conical flask. Ultrasonic dispersion was then performed for 1.5 hours, and thereby a reagent (hydrate formation promoter) was obtained.

With an amphiphilic polyurethane sponge material used as a carrier of the reagent, wherein a mass ratio of the amphiphilic polyurethane sponge material and the hydrate formation promoter is 1:20, a hydrate formation reaction was performed with the reagent at a temperature of 15° C. and a pressure of 3.5 MPa to allow storage of methane hydrate. The methane storage capacity for every cubic meter of hydrate was 72 cubic meters. The induction time for methane hydrate formation was 32 seconds, and the reaction complete time was 47 minutes.

Embodiment 2

According to a total volume of 100 mL, 85 mL of water and 15 mL of cyclopentane were measured out with a measuring cylinder and added into a closed conical flask. The total mass of the liquid was measured to be 96.27 g using a balance. Based on the total mass of the mixed solution, 0.07 g of sodium dodecyl sulfate was weighed out according to a mass fraction of 0.07% and added into the conical flask. Ultrasonic dispersion was then performed for 2 hours, and thereby a reagent (hydrate formation promoter) was obtained.

With an amphiphilic polyurethane sponge material used as a carrier of the reagent, wherein a mass ratio of the amphiphilic polyurethane sponge material and the hydrate formation promoter is 1:20, a hydrate formation reaction was performed with the reagent at a temperature of 15° C. and a pressure of 5 MPa to allow storage of methane hydrate. The methane storage capacity for every cubic meter of hydrate was 92 cubic meters. The induction time for methane hydrate formation was 21 seconds, and the reaction complete time was 36 minutes.

Embodiment 3

According to a total volume of 100 mL, 80 mL of water and 20 mL of cyclopentane were measured out with a measuring cylinder and added into a closed conical flask. The total mass of the liquid was measured to be 95.02 g using a balance. Based on the total mass of the mixed solution, 0.05 g of sodium dodecyl sulfate was weighed out according to a mass fraction of 0.05% and added into the conical flask. Ultrasonic dispersion was then performed for 40 minutes, and thereby a reagent (hydrate formation promoter) was obtained.

With an amphiphilic polyurethane sponge material used as a carrier of the reagent, wherein a mass ratio of the amphiphilic polyurethane sponge material and the hydrate formation promoter is 1:20, a hydrate formation reaction was performed with the reagent at a temperature of 10° C. and a pressure of 7.2 MPa to allow storage of methane hydrate. The methane storage capacity for every cubic meter of hydrate was 157 cubic meters. The induction time for methane hydrate formation was 10 seconds, and the reaction complete time was 27 minutes.

Comparative Example 1

According to a total volume of 100 mL, 80 mL of water and 20 mL of cyclopentane were measured out with a measuring cylinder and added into a closed conical flask. The total mass of the liquid was measured to be 95.02 g using a balance. Based on the total mass of the mixed solution, 0.05 g of sodium dodecyl sulfate was weighed out according to a mass fraction of 0.05% and added into the conical flask. Ultrasonic dispersion was then performed for 40 minutes, and thereby a reagent (hydrate formation promoter) was obtained.

A hydrate formation reaction was performed with the reagent at a temperature of 10° C. and a pressure of 7.2 MPa to allow storage of methane hydrate. The methane storage capacity for every cubic meter of hydrate was 124 cubic meters. The induction time for methane hydrate formation was 6 minutes, and the reaction complete time was 127 minutes.

Comparative Example 2

A hydrate formation reaction was performed with pure water at a temperature of 10° C. and a pressure of 7.2 MPa to allow storage of methane hydrate. The methane storage capacity for every cubic meter of hydrate was 25 cubic meters. The induction time for methane hydrate formation was 62 minutes, and the reaction complete time was 450 minutes.

Comparative Example 3

According to a total volume of 100 mL, 80 mL of water and 20 mL of cyclopentane were measured out with a measuring cylinder and added into a closed conical flask. Ultrasonic dispersion was then performed for 40 minutes, and thereby a reagent (hydrate formation promoter) was obtained.

With an amphiphilic polyurethane sponge material used as a carrier of the reagent, wherein a mass ratio of the amphiphilic polyurethane sponge material and the hydrate formation promoter is 1:20, a hydrate formation reaction was performed with the reagent at a temperature of 10° C. and a pressure of 7.2 MPa to allow storage of methane hydrate. The methane storage capacity for every cubic meter of hydrate was 131 cubic meters. The induction time for methane hydrate formation was 12 seconds, and the reaction complete time was 40 minutes.

Comparative Example 4

According to a total volume of 100 mL, 100 mL of water was measured out with a measuring cylinder and added into a closed conical flask. Based on the total mass of the mixed solution, sodium dodecyl sulfate was weighed out according to a mass fraction of 0.05% and added into the conical flask. Ultrasonic dispersion was then performed for 40 minutes, and thereby a reagent (hydrate formation promoter) was obtained.

With an amphiphilic polyurethane sponge material used as a carrier of the reagent, wherein a mass ratio of the amphiphilic polyurethane sponge material and the hydrate formation promoter is 1:20, a hydrate formation reaction was performed with the reagent at a temperature of 10° C. and a pressure of 7.2 MPa to allow storage of methane hydrate. The methane storage capacity for every cubic meter of hydrate was 53 cubic meters. The induction time for methane hydrate formation was 37 minutes, and the reaction complete time was 370 minutes.

It can be concluded from a comparison between embodiment 3 and the comparative examples 1-4 that, the hydrate formation promoter obtained in embodiment 3, in storage of methane hydrate, exhibited a methane storage capacity of 157 cubic meters for every cubic meter of hydrate, a methane hydrate formation induction time of 10 seconds, and a reaction complete time of 27 minutes. The hydrate formation promoter prepared from sodium dodecyl sulfate and cyclopentane exhibited a hydrate formation induction time shorted than that in the comparative example 3, a reaction complete time shorted than that in the comparative example 3, and a methane storage capacity for every cubic meter of hydrate much higher than those in the comparative examples 1-4.

Embodiment 4

According to a total volume of 100 mL, 76.6 mL of water and 23.4 mL of cyclopentane were measured out with a measuring cylinder and added into a closed conical flask. The total mass of the liquid was measured to be 97.52 g using a balance. Based on the total mass of the mixed solution, 0.01 g of sodium dodecyl sulfate was weighed out according to a mass fraction of 0.01% and added into the conical flask. Ultrasonic dispersion was then performed for 1.5 hours, and thereby a reagent (hydrate formation promoter) was obtained.

With an amphiphilic polyurethane sponge material used as a carrier of the reagent, wherein a mass ratio of the amphiphilic polyurethane sponge material and the hydrate formation promoter is 1:15, a hydrate formation reaction was performed with the reagent at a temperature of 0.5° C. and a pressure of 1 MPa to allow storage of methane hydrate. The methane storage capacity for every cubic meter of hydrate was 83 cubic meters. The induction time for methane hydrate formation was 13 seconds, and the reaction complete time was 28 minutes.

Embodiment 5

According to a total volume of 100 mL, 95 mL of water and 5 mL of cyclopentane were measured out with a measuring cylinder and added into a closed conical flask. The total mass of the liquid was measured to be 97.52 g using a balance. Based on the total mass of the mixed solution, 0.01 g of sodium dodecyl sulfate was weighed out according to a mass fraction of 0.01% and added into the conical flask. Ultrasonic dispersion was then performed for 1.5 hours, and thereby a reagent (hydrate formation promoter) was obtained.

With an amphiphilic polyurethane sponge material used as a carrier of the reagent, wherein a mass ratio of the amphiphilic polyurethane sponge material and the hydrate formation promoter is 1:24, a hydrate formation reaction was performed with the reagent at a temperature of 25° C. and a pressure of 30 MPa to allow storage of methane hydrate. The methane storage capacity for every cubic meter of hydrate was 97 cubic meters. The induction time for methane hydrate formation was 11 seconds, and the reaction complete time was 48 minutes.

After introducing the amphiphilic polyurethane sponge material as a carrier, the present invention has realized a reaction complete time of 10-3000 seconds for methane hydrate formation and a methane storage capacity of 72-157 cubic meters for every cubic meter of hydrate, wherein the hydrate formation induction is almost momentary 010-60 seconds). Without using the amphiphilic polyurethane sponge material as the carrier, it exhibits a reaction complete time of 120-300 minutes for methane hydrate formation, a methane storage capacity of 42-127 cubic meters for every cubic meter of hydrate, and a hydrate formation induction time of 3-15 minutes.

The above embodiments are preferred embodiments of the present invention, but the implementation of the present invention is not limited to the above embodiments. Any other changes, modifications, substitutions, combinations, and simplifications without departing from the spirit and principle of the present invention shall be regarded as equivalent replacements and included in the scope of the present invention.

What is claimed is:

1. A method for methane storage using a hydrate formation promoter, comprising adding the hydrate formation promoter into a reaction vessel, introducing methane to the reaction vessel at a temperature of 1° C.-25° C. and a pressure of 0-30 MPa to cause a hydrate formation reaction to occur to form methane hydrate and dissociating the methane hydrate in a methane hydrate dissociation device;

wherein the hydrate formation promoter is a mixed aqueous solution comprising cyclopentane, sodium dodecyl sulfate and water, wherein a volume fraction of the cyclopentane is 5% to 23.4% based on a total volume of the mixed aqueous solution, and a mass fraction of the sodium dodecyl sulfate is 0.01% to 0.08% based on a total mass of the mixed aqueous solution; and wherein the methane hydrate dissociation device comprises a methane hydrate storage tank, a supersonic separation unit for separating the water, the cyclopentane and the methane, and a cyclopentane recovery tank;

the methane hydrate storage tank, the supersonic separation unit, and the cyclopentane recovery tank are connected in series;

dissociated methane in the methane hydrate storage tank is passed through the supersonic separation unit, wherein the water and the cyclopentane are condensed into a plurality of liquids and flow into the cyclopentane recovery tank for recycling, and methane gas is discharged; and a cold energy is generated during the step of dissociating the methane hydrate, and the cold energy is applied to the supersonic separation unit in order to reduce an energy consumption.

2. The method of claim 1, wherein the temperature is 10° C.-15° C. and the pressure is 3-5 MPa.

3. The method of claim 1, wherein an amphiphilic polyurethane sponge material is used as a carrier of the hydrate formation promoter, wherein the amphiphilic polyurethane sponge material adsorbs the hydrate formation promoter.

\* \* \* \* \*